April 11, 1939.                J. M. CHRISTMAN                2,153,914
                                VIBRATION DAMPER
                              Filed Feb. 21, 1936
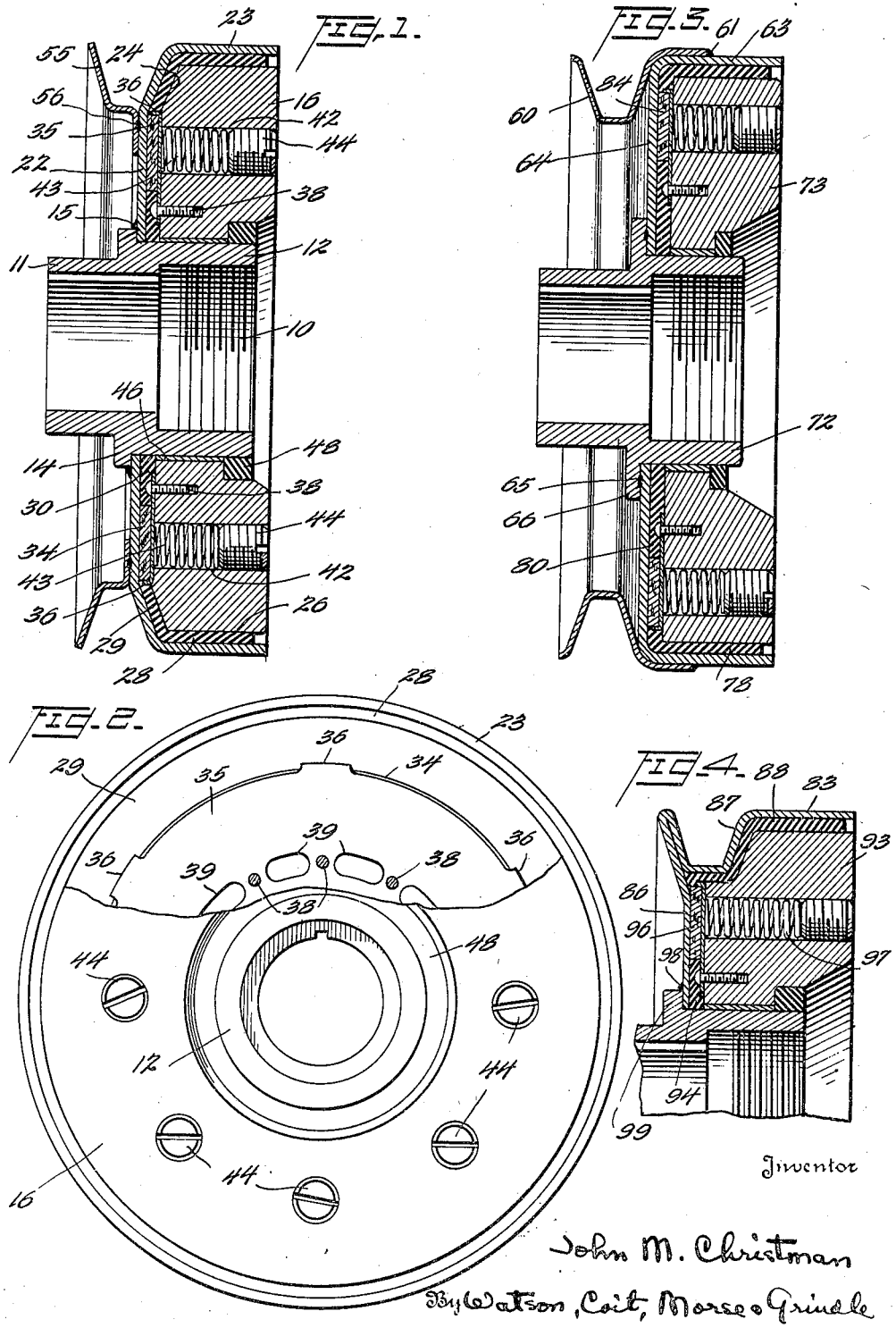

Patented Apr. 11, 1939

2,153,914

UNITED STATES PATENT OFFICE 2,153,914

VIBRATION DAMPER

John M. Christman, Detroit, Mich., assignor to Packard Motor Car Company, Detroit, Mich., a corporation of Michigan Application February 21, 1936, Serial No. 65,163

2 Claims. (Cl. 74—574)

This invention relates to internal combustion engines and has for its object the provision of means for damping torsional vibrations induced in the engine crankshaft as the result of periodic torque impulses applied thereto. It is a feature of the invention that the various component parts of the vibration damper may be separately and cheaply constructed and readily assembled.

The damper which forms the basis of the present invention is of the type employing an inertia member supported for slight displacement relative to the crankshaft in response to torsional vibrations induced in the shaft, and a coupling between the inertia member and the shaft, this coupling serving to yieldingly connect the inertia member to the shaft in such manner as to permit the required relative displacement of the inertia member and shaft, and also serving as an energy absorbing device, the energy of vibration being dissipated in the form of heat as the result of friction developed in the coupling on occurrence of such relative displacement.

More specifically, the present damper is of the type in which the inertia member is coupled to the shaft by means composed, at least in part, of rubber or similar material adapted to develop a considerable amount of internal friction when subjected to stress. The dissipation of energy by reason of such internal friction in a coupling member is frequently not sufficient to effectively damp the vibrations, and the action of the coupling member is preferably augmented by the provision of a friction connection between the inertia member and the shaft, the combined action of the yielding and friction connections serving to prevent dangerous increase in amplitude of the vibrations.

It has heretofore been proposed to provide dampers of this character with a hub member which is adapted to be mounted on a crankshaft and secured thereto, the hub member forming a portion of a pulley arranged to receive a fan belt for driving the fan customarily associated with the cooling system of the engine. It is an object of the present invention to simplify this construction and reduce the axial dimensions thereof by associating the fan driving pulley more directly with the damper. Thus in the preferred form of the invention the fan pulley is secured to or is formed integrally with a radially directed portion of the damper which is secured in turn to the damper hub, preferably by welding.

Thus in the present construction, at least a part of the resilient coupling between the inertia member and the member carried by the crankshaft is disposed at a considerable radial distance from the shaft axis, at which point the relative linear movement of the inertia member and the member carried by the crankshaft is considerable, even for small angular displacement of the members. In such a construction the tendency of the inertia member to wobble during operation is much more effectively resisted by the rubber than when the latter is located at a point closer to the crankshaft axis, the leverage exerted on the rubber by the inertia member when displaced laterally of its normal plane of rotation being decreased as the radial distance between the shaft axis and the inertia member is increased. Again, if the rubber is located further from the crankshaft axis, the extent of distortion of the rubber for a given relative angular displacement of the inertia member and the member carried by the crankshaft is materially increased, whereby more effective damping of vibrations can be obtained.

It has therefore been proposed to provide a member carried by the crankshaft which comprises a radially extending web and an axially directed flange carried by the web and disposed at a considerable distance from the crankshaft axis. The inertia member is received within this axially directed flange, and a thin sheet of rubber or other deformable material is interposed between and surface bonded to the flange and to the periphery of the inertia member. According to the present invention, the fan pulley is associated with the shaft carried member and is disposed adjacent the axially directed flange thereof. For example, in one form of the invention the fan pulley and the shaft carried member are integrally formed from a single sheet metal stamping with resultant reduction in the cost of the unit and of the space measured axially of the crankshaft required to accommodate the same. In other forms of the invention the fan pulley is secured directly to the radially or axially extending portion of the shaft carried member, for instance by welding.

Other objects and features of the invention will be apparent from the following description taken in connection with the accompanying drawing, in which Figure 1 is a sectional view taken substantially on the diameter of a damper constructed in accordance with the invention;

Figure 2 is an end elevation of the damper shown in Figure 1 with certain of the parts broken away;

Figure 3 is a similar view illustrating a modified form of damper; and

Figure 4 is a partial sectional view of still another modification.

The damper illustrated in Figures 1 and 2 of the drawing is adapted to be supported on the forward end of the crankshaft, for instance by means of a hub portion 12 which is threaded interiorly as indicated at 10 for cooperation with corresponding threads formed on the crankshaft, relative rotation of the hub 12 and the crankshaft being prevented by means of a keyed extension 11 formed on the hub. It will be appreciated that the damper which forms the subject of the present invention may be secured more directly to the crankshaft if desired, but it is ordinarily found convenient to provide a damper in the form of a unit which may be readily mounted on or detached from the crankshaft.

The damper consists primarily of a shaft carried member and an inertia member, the latter being supported for substantially uniform rotation and being connected to the shaft carried member through deformable means adapted to be distorted on the occurrence of vibration in the shaft, whereby the energy of vibration is dissipated in the form of heat. Thus the shaft carried member may comprise a generally disk-like radially extending portion 22 and a peripheral annular axially directed portion 23, it being observed that the shaft carried member is thereby formed to provide a generally cup-shaped structure disposed coaxially with the crankshaft and open toward the rear end of the latter. The radially extending portion of the shaft carried member is secured rigidly to the hub portion 12, for instance by welding as indicated at 15 to a flange 14 formed on the hub. The inertia member 16 is received within this cup-shaped structure and is of generally annular shape, being provided with a generally radial face 24 and a circumferential face 26, these faces being respectively arranged in opposed spaced relation with the corresponding faces of the radial portion 22 and the axially directed portion 23 of the shaft carried member. The deformable means is interposed between the opposed spaced faces of these members, and is preferably in the form of a thin sheet or sheets of imperfectly elastic material such as rubber, this material being vulcanized or otherwise surface bonded to both members. For example, a rubber sheet 28 may be interposed between and vulcanized to the inner face of the axially directed portion 23 of the shaft carried member and the circumferential face 26 of the inertia member 16 over substantially the entire area of these faces, the rubber sheet further extending inwardly as indicated at 29 and being surface bonded to the radial face 24 of the inertia member 16 and the opposed rearwardly directed face of the radially directed portion 22 of the shaft carried member. A second sheet of rubber or similar material 30, spaced inwardly of the sheet 28, is also connected between these opposed radial faces as hereinafter more fully described. Intermediate the rubber sheets 28 and 30 is positioned a friction developing device acting between the inertia member and the shaft carried member to resist relative oscillatory movement thereof, it being observed that this friction developing device is completely isolated by the resilient elements 28 and 30 in the manner described.

In the preferred embodiment of the invention the friction developing device comprises an annulus 34 of any well-known friction developing material such as cork, asbestos, or the like. Ground cork impregnated with a binder has been found particularly suitable. The annulus 34 may be carried by a flat plate or disk 35 of relatively thin sheet metal or the like, plate 35 being provided with a peripheral flanged portion, preferably in the form of a plurality of axially directed lugs 36, which engage the periphery of the annulus 34 as shown more particularly in Figure 2 to retain and center the latter in position. If desired the annulus may be cemented or otherwise secured to the plate 35 so that these elements may be readily assembled in the damper as a unit.

The plate 35 may be apertured to receive a plurality of elements 38 which may be threaded in the inertia member 16 to secure the plate rigidly thereto. The plate 35 may also be slotted at a plurality of points to increase the flexibility thereof, as indicated at 39.

In order to increase the amount of friction developed by the annulus 34, coil springs or other resilient means are preferably disposed in a plurality of circumferentially spaced apertures 42 extending through the inertia member from the rear to the forward side thereof. These coil springs engage the plate 35, each spring reacting against a screw 44 which is threaded in the outer end of the associated aperture 42, so that by manipulation of the screw the degree of compression of the spring 43 and thereby the amount of friction developed in the face of the annulus 34 may be readily adjusted from outside the damper and without interference with the working parts thereof. Preferably the plate 35 is so assembled with respect to the inertia member 16 that each of the slots 39 in the plate lies adjacent the point of contact of each of the coil springs 43 with the plate to provide the maximum resilience at these points. It will be observed that when the sheet 30 of resilient material is positioned between the inertia member 16 and the shaft carried member 22, it will engage the plate 35 secured to the inertia member and will be surface bonded thereto. In the event rubber is employed and is vulcanized in position, the rubber will of course flow through the slots 39 in the plate 35 and adhere directly to the inertia member 16.

The damper is preferably, although not necessarily, constructed so as to afford a journal bearing for the inertia member 16 on the crankshaft. For instance, a bushing 46 may be interposed between the inertia member and the hub portion 12 of the damper, this bushing being preferably of the self-lubricating type. An annular recess is formed in the inertia member on the rear side of this bushing, and an annulus 48 of resilient material is seated in this recess and surface bonded to both the inertia member and the hub portion of the damper. As in the case of the resilient elements heretofore described, imperfectly elastic material such as rubber or rubberized fabric is preferably used, and vulcanization may be resorted to for the purpose of effecting the necessary bonding. The resilient annulus 48 contributes only in small part to the establishment of a resilient connection between the shaft carried member and the inertia member and to the resultant damping of relative movement between these members, since the annulus 48 is disposed near the axis of the crankshaft at which point distortion on occurrence of relative angular displacement of the crankshaft and inertia members is fairly small. The resilient elements 30 and 28, and particularly the latter, are on the contrary distorted to a very considerable extent on the occurrence of relative movement between the inertia and shaft carried members and the extent of deformation of these elements on the occurrence of such relative movement is increased by the use of the elements in the form of relatively thin sheets. Thus when torsional vibrations are induced in the crankshaft and transmitted to the shaft carried member, the mass of the inertia member 16 is sufficient to maintain the latter in a state of relatively uninterrupted rotation, and the resulting relative angular displacement of the inertia member and shaft carried member distorts the thin sheets of imperfectly elastic material, the internal hysteresis of these sheets dissipating the vibrational energy in the form of heat in the manner well understood in the art to which this invention relates.

It may be further pointed out that all of the elastic elements employed serve to resist relative axial displacement of the shaft carried member and the inertia member. In this way the necessary resistance to reaction of the springs 43 is established.

It will be observed that the preferred embodiment of the invention shown herein may be inexpensively constructed and readily assembled. Thus the plate 35 and the annulus 34 carried thereby may be secured to the inertia member by the threaded elements 38, and the inertia member 16 introduced in the shaft carried member together with the rubber elements 28 and 30, the latter being then vulcanized in position. If the bushing 46 and the rubber annulus 48 are also employed, the assembled inertia member and shaft carried member may be secured in position on the hub portion 12 of the damper by welding as indicated at 15 and the vulcanization of the element 48 to the inertia member and the hub portion then effected. Alternatively, the entire vulcanizing process may be carried out at one and the same time with the remaining elements of the damper completely assembled on the hub portion 12. Introduction of the coil springs 43 in the apertures 42 and adjustment of the degree of compression thereof complete the assembling operation.

In the form of the invention shown in Figure 1, the fan pulley is constituted by an annular element 55 which is secured to the shaft carried member in any convenient manner, for instance by welding as indicated at 56 to the radially extending portion of the shaft carried member. This element 55 defines, together with the adjacent inclined portion of the shaft carried element, a generally V-shaped groove for the reception of a fan belt, a pulley of maximum diameter being thus afforded without materially increasing the weight of the damper unit as a whole and without increasing the diametrical dimensions thereof. The cost of production is obviously quite small and the weight of the members carried by and rotatable with the crankshaft is minimized.

Figure 3 of the drawing illustrates a slightly modified form of the device in which the fan pulley 60 is formed as a complete unit to afford engagement with both sides of the fan belt and is secured, for instance by welding as indicated at 61, to the axially directed annular portion 63 of the shaft carried member. As in the first described embodiment of the invention, the pulley is actually carried by and driven through the radially extending portion 64 of the shaft carried member, the latter being secured by welding as at 65 to the flange 66 on the hub member 72. The inertia member 73 is received within the shaft carried member and is resiliently connected thereto through sheets of deformable material 78 and 80 as described hereinbefore, a friction annulus 84 being carried by the inertia member and engaging the shaft carried member.

In Figure 4 of the drawing the fan pulley is formed integrally with the radially extending portion 86 of the shaft carried member and the axially directed annular portion 83 thereof, the shaft carried member being deformed to provide a re-entrant portion 87 affording the usual V-shaped groove for the reception of the fan belt. A sheet 88 of deformable material is interposed between the inertia member 93 and the shaft carried member and extends about that portion of the shaft carried member which forms the fan belt pulley. As in the two previously described forms of the invention, a second sheet of deformable material 94 is employed between the inertia member and the shaft carried member to strengthen the resilient connection therebetween and to seal the friction element 96 which is urged against the shaft carried member by means of the coil spring 97. The radially extending portion of the shaft carried member is secured by welding as indicated at 98 to a flange 99 formed on the hub portion 95 of the damper.

It will be observed that the three modified forms of the invention are similar in detail except for the variation in the form of the fan belt pulley and its mode of connection to the damper proper. Various other alterations of the arrangements shown herein will readily suggest themselves to one skilled in the art and it will be understood that the invention is limited only to the extent indicated in the claims appended hereto.

Having thus described the invention, what is claimed as new and desired to be secured by Letters Patent is:

1. In a vibration damper for crankshafts, the combination with a member adapted to be secured to a shaft and having a cylindrical hub portion, an axially extending cylindrical outer rim portion overlying said hub portion, and a web connecting said portions, of an inertia member of annular shape positioned intermediate said rim and hub portions and journaled on the latter, means of deformable, energy absorbing material interposed between and surface bonded to said rim portion and said inertia member over substantially the entire peripheral surface of the latter to resist relative rotation of said members, whereby vibrations of relatively low amplitude and high frequency may be effectively dampened, and a fan pulley rotatable from said hub by said web, said pulley comprising an annular flange welded to said web and defining therewith a groove for the reception of a fan belt.

2. In a device for attachment to the crankshaft of an internal combustion engine, the combination with a hub receivable on the shaft, of a member carried by said hub and formed to provide a generally radial portion and an annular axially directed portion, an inertia member received within said axially directed portion and rotatable with respect thereto, means of deformable, energy absorbing material interposed between said inertia member and said axially directed portion and surface bonded thereto, whereby vibrations induced in said crankshaft may be damped, and annular means disposed adjacent said radial portion and extending generally axially away from said axially directed portion to define a groove for the reception of a driving belt, said last named means comprising a portion of said first named member and a flange element separate from said first named member and welded thereto.

JOHN M. CHRISTMAN.